(12) United States Patent
Ji (10) Patent No.: US 9,521,690 B2
(45) Date of Patent: *Dec. 13, 2016

(54) METHOD FOR QOS DELIVERY IN CONTENTION-BASED MULTI HOP NETWORK

(71) Applicant: AT&T Intellectual Property I, L.P., Atlanta, GA (US)

(72) Inventor: Lusheng Ji, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,765

(22) Filed: Jun. 15, 2015

(65) Prior Publication Data

US 2015/0282212 A1    Oct. 1, 2015

Related U.S. Application Data

(60) Continuation of application No. 13/291,318, filed on Nov. 8, 2011, now Pat. No. 9,060,310, which is a
(Continued)

(51) Int. Cl.
*H04W 28/26* (2009.01)
*H04J 3/16* (2006.01)
*H04W 74/08* (2009.01)
*H04L 12/751* (2013.01)
*H04L 12/725* (2013.01)
*H04W 40/28* (2009.01)
*H04L 12/721* (2013.01)
(Continued)

(52) U.S. Cl.
CPC .......... *H04W 74/0808* (2013.01); *H04L 45/10* (2013.01); *H04L 45/302* (2013.01); *H04L 45/38* (2013.01); *H04L 47/14* (2013.01); *H04W 28/0289* (2013.01); *H04W 28/26* (2013.01); *H04W 40/28* (2013.01); *H04W 28/04* (2013.01); *H04W 76/02* (2013.01)

(58) Field of Classification Search
CPC ...... H04W 28/26; H04W 40/28; H04W 28/04; H04W 76/02; H04L 45/10; H04L 45/302
See application file for complete search history.

(56) References Cited

U.S. PATENT DOCUMENTS 7,103,371 B1 * 9/2006 Liu .................... H04L 1/1867
370/348
7,265,376 B2    9/2007 Graham et al.
(Continued)

OTHER PUBLICATIONS

Han, Bo et al., "Channel Access Throttling for Improving WLAN QoS," Sensor, Mesh and Ad Hoc Communications and Networks, 2009, SECON '09, 6th Annual IEEE Communications Society Conference, Jun. 22-26, 2009, 9 pages.

*Primary Examiner* — Luat Phung
(74) *Attorney, Agent, or Firm* — Zagorin Cave LLP (57) ABSTRACT

An arrangement and a method that, for a given pair of nodes that wish to intercommunicate with a high QoS measure, converts a portion of the contention-based network into a contention-less subnetwork by sending a reservation message and a confirmation message between the given pair of nodes. All nodes that are on the paths used for communicating between the pair of nodes are protected from interference by causing all nodes that potentially can interfere to enter a non-transmitting state.

14 Claims, 1 Drawing Sheet

Related U.S. Application Data division of application No. 12/284,868, filed on Sep. 25, 2008, now Pat. No. 8,077,737.

(51) Int. Cl.
*H04L 12/801* (2013.01)
*H04W 28/02* (2009.01)
*H04W 28/04* (2009.01)
*H04W 76/02* (2009.01)

(56) References Cited

U.S. PATENT DOCUMENTS

| | | |
|---|---|---|
| 7,505,751 B1 | 3/2009 | Backes |
| 8,125,969 B2 | 2/2012 | Ji et al. |
| 8,144,613 B2 | 3/2012 | Roy et al. |
| 2003/0033394 A1* | 2/2003 | Stine .............. H04L 12/5695 709/222 |
| 2003/0204616 A1 | 10/2003 | Billhartz et al. |
| 2004/0022223 A1 | 2/2004 | Billhartz |
| 2004/0037247 A1 | 2/2004 | Ngo |
| 2004/0109428 A1 | 6/2004 | Krishnamurthy |
| 2006/0067283 A1 | 3/2006 | So et al. |
| 2006/0098607 A1 | 5/2006 | Zeng et al. |
| 2006/0114869 A1 | 6/2006 | Kado |
| 2006/0146717 A1 | 7/2006 | Conner et al. |
| 2006/0187840 A1 | 8/2006 | Cuffaro et al. |
| 2006/0259617 A1 | 11/2006 | Lee |
| 2007/0010237 A1 | 1/2007 | Jones et al. |
| 2007/0076742 A1 | 4/2007 | Du et al. |
| 2007/0133447 A1 | 6/2007 | Wentink |
| 2007/0147255 A1 | 6/2007 | Oyman |
| 2007/0223439 A1 | 9/2007 | Kosai |
| 2007/0286139 A1* | 12/2007 | Niu .................. H04L 45/26 370/338 |
| 2008/0137620 A1 | 6/2008 | Wang et al. |
| 2008/0170521 A1 | 7/2008 | Govindan et al. |
| 2009/0073921 A1 | 3/2009 | Ji et al. |
| 2009/0129323 A1 | 5/2009 | Chen et al. |
| 2009/0238075 A1 | 9/2009 | Mosko |
| 2010/0008247 A1 | 1/2010 | Kwon et al. |
| 2010/0074161 A1 | 3/2010 | Munari et al. |
| 2011/0032883 A1 | 2/2011 | Patil et al. |
| 2011/0182231 A1 | 7/2011 | Wang et al. |
| 2012/0207143 A1* | 8/2012 | Banerjee .......... H04W 16/14 370/338 |

\* cited by examiner

FIG. 1

△ INITIATOR NODE
☐ RESPONDER NODE
⬠ PATH NODE
⬡ NEIGHBOR NODE
○ NETWORK NODE

FIG. 2

RESERVATION MESSAGE
- TYPE
- SENDER ADDRESS
- ADDRESSEE ADDRESS
- PATH LIST
- RESERVATION IDENTIFIER
- PASSCODE
- RESERVATION DURATION
- IDLE TIME
- PACKET ARRIVAL INTERVAL
- STEP INTERVAL
- NEGOTIABLE
- NEIGHBOR SLEEP ALLOWED
- NEW CHANNEL

METHOD FOR QOS DELIVERY IN CONTENTION-BASED MULTI HOP NETWORK

CROSS-REFERENCE TO RELATED APPLICATION(S)

This application is a continuation of U.S. application Ser. No. 13/291,318, filed Nov. 8, 2011, which is a divisional of U.S. application Ser. No. 12/284,868, filed Sep. 25, 2008, now U.S. Pat. No. 8,077,737, all of which applications are incorporated herein by reference.

BACKGROUND

This relates to provision of service and more particularly to an arrangement and a method for delivering service to a specified pair of nodes in a multi-hop contention-based network, with the delivered service having a high quality-of-service (QoS) level.

One contention-based medium access method that is widely used in unstructured wireless communication networks is the Carrier Sense Multiple Access (CSMA) method. For example, both WiFi and Zigbee standards mandate support for some form of CSMA. Characterized by their "flatness," multi-hop wireless networks, such as mobile ad hoc networks and wireless mesh networks, are often CSMA networks as well.

A transmitter in a CSMA network must determine whether the channel is busy before accessing the communication channel. If the channel is busy, the transmitter refrains from transmitting and attempts to access the channel again at a later time. If the channel is idle, the transmitter may begin its transmission immediately, begin its transmission with a certain probability, or wait another period of time—creating an extended time window—to further reduce probability of collision and only access the channel (i.e., begin transmitting) if the channel remains idle during this extended time window.

CSMA is inherently inefficient in busy networks because nodes effectively waste time in waiting when channel access is found to be unavailable. It has been shown that channel access performance degrades rapidly as network load and node density increase. In addition, the duration and outcome of the contention process are only statistically predictable. Consequently, CSMA is not well suited for delivering data with high QoS requirements, such as low delay and low jitter. The same is true for other contention-based networks.

FIELD OF THE INVENTION

Description of the Related Art

SUMMARY OF EMBODIMENTS OF THE INVENTION

An advance in the art is realized in a multi-hop contention-based network with an arrangement and a method that, for a given pair of nodes that wish to intercommunicate with a high QoS measure, converts a portion of the contention-based network into a contention-less subnetwork that is guaranteed to be available for communicating information as soon as the information is available and such communication will neither interfere with nor be interfered by other communications in the rest of the network. Since the subnetwork is always ready to accept and deliver data, the achieved QoS is superior to that of the contention-based remainder of the network. Typically, the subnetwork is established for a time interval, and when the time interval expires, the contention-less nature of the subnetwork's operation is turned off, thereby disbanding the subnetwork and effectively returning the communications resources to the contention-based network.

The contention-less subnetwork is created when one node of the network (the Initiator node) wishes to communicate with another node of the network (the Responder node). The Initiator node sends a Reservation message to the Responder node, requesting agreement for the establishment of a subnetwork. When the Responder node returns a Reservation Confirmation message to the Initiator node, the contention-less subnetwork is established. The subnetwork consists of the Initiator and Responder nodes, nodes on a path from the Initiator node to the Responder nodes, nodes on a path from the Responder node to the Initiator node, and the transmission links therebetween. In typical embodiments of this invention the two paths are one common path.

The contention-less nature of the subnetwork is realized (i.e., established) by the Reservation Confirmation message causing all nodes that "hear" the Reservation Confirmation message to cease their transmissions, which allows the nodes along the subnetwork's path(s) to always be in position to receive packets from other nodes along the path without interference from any neighboring nodes.

Optionally, during the time that the subnetwork is established, nodes that are part of the subnetwork carry traffic only that originates at the Initiator node or the Responder node.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
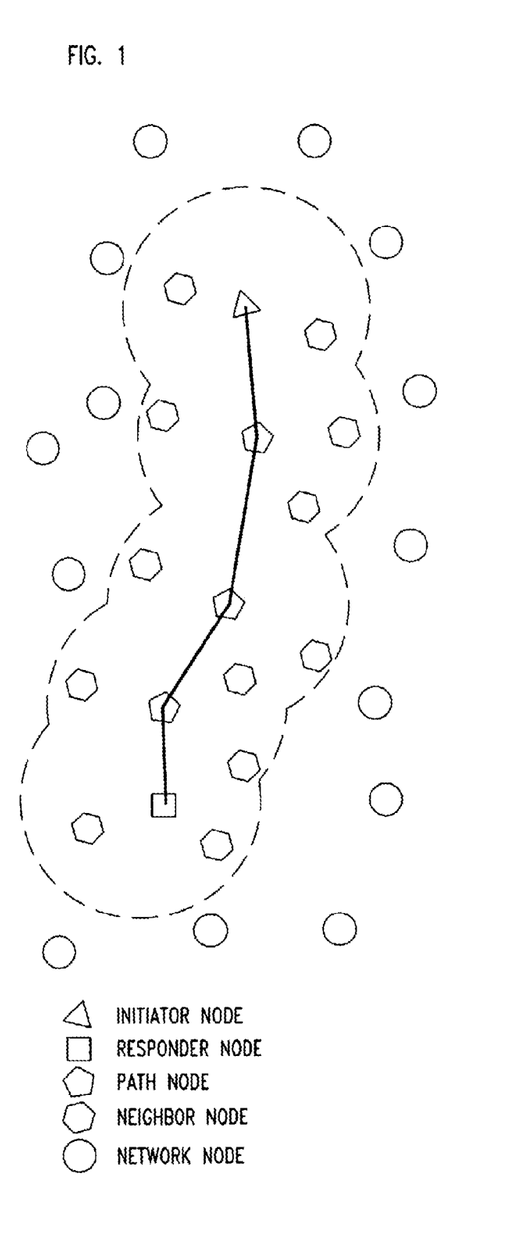
FIG. 1 depicts a wireless network, an initiator node, a responder node, a communication path between them, and a neighborhood (quiet zone) of the path.

FIG. 1 depicts a multi-hop network or, more particularly, the nodes of the network, as well as a reserved path and a quiet zone surrounding the path. The network may be a wireless network.

The arrangement and method disclosed herein enables creating one or more contention-less subnetworks within a contention-based network. Each of the subnetworks is established between an Initiator node (the triangle in FIG. 1) that wishes to establish a communication path and a Responder node (the square in FIG. 1) with which the Initiator node wishes to communicate, often for a prearranged duration, over a determined path (the solid line in FIG. 1 between the Initiator and the Responder nodes passing through the pentagons, which are the path nodes) that is free from interference from any node whose transmissions can be detected by any of the nodes in the one or more paths that characterize the subnetwork (the hexagons in FIG. 1, which are the neighbor nodes).

Establishment of a subnetwork begins when the Initiator node sends a Reservation message that is addressed to the Responder node. The message traverses the network passing through any number of intermediate nodes and each intermediate node relays the Reservation message towards its ultimate destination; i.e., the Responder node. When the Reservation message reaches the Responder node, the latter returns a Reservation Confirmation message.

In accord with the principles disclosed herein, all nodes that can possibly interfere with the subnetwork—meaning that if they transmit at will they might interfere with information transmitted by any of the nodes in the subnetwork—are caused to enter a quiet (non-interfering) state when the subnetwork is established and before actual communication takes place, for the duration of time that the subnetwork exists.

Typically, an initiator node chooses to establish the subnetwork for a prearranged a time interval, so such neighboring networks remain in the non-transmitting state until expiration of the prearranged time interval, or until it is otherwise released, as disclosed below. Specifically, in accord with one embodiment, a node enters a non-interfering state when it receives the Reservation Confirmation message. In accord with another embodiment, a node enters a non-interfering state when it receives the Reservation Confirmation message or the Reservation message. In yet another embodiment, a node enters a non-interfering state when it receives the Reservation Confirmation message or an Acknowledgement message.

In the context of this disclosure, a node is in a non-interfering state when it is not transmitting in the relevant channel (for example, frequency band). This could mean that the node is fully functional on another channel, is functional in the relevant channel but refrains from transmitting, or is in a power conservation mode ("asleep"), meaning that all circuits are turned off except for a "wakeup" circuit that upon the occurrence of a predetermined condition—for example, the expiration of a preset time interval—powers up the remaining circuits.

Thus, at the moment the Reservation Confirmation message reaches the Initiator node, the subnetwork is established in the sense that the Initiator node can begin sending information without fear of interference from neighboring nodes. In some embodiments, the Responder node does not know of the fact that the subnetwork was, in fact, established until it receives its first information message from the Initiator node; for example, a packet of information.

From the multi-hop wireless network point of view, the effect of setting up such a quite zone is that a portion of the network will disappear—will become a "dark region." It is expected that the multi-hop forwarding protocol that is expected to be employed (e.g., the Ad hoc On-demand Distance Vector or AODV protocol) is able to reroute traffic around this dark region.

It should be mentioned that an implied requirement here is that the transmitters of the neighbor nodes have a reach that is no greater than the reach of their receivers. Put another way, a neighbor node's receiver should be sensitive enough to receive protocol messages relayed by node in the subnetwork that the node in question can affect by its transmissions (the protocol messages mentioned so far are the Reservation message and the Reservation Confirmation message).

The principles disclosed herein are applicable to wireless as well as to wired networks, but for sake of clear exposition the following limits the disclosure to the illustrative example of a multi-hop wireless packet network that normally operates in the CSMA protocol. Normally when speaking of a CSMA network the implied statement is that all nodes of the network operate on the same channel, for example, in the same frequency band. It is, of course, possible to effectively have a plurality of overlaid CSMA networks, each operating at a different frequency band (or some other orthogonal channel). Unless otherwise stated, however, the descriptions herein assume operation in one common channel.

As indicated above, the method disclosed so far employs a Reservation message and a Reservation Confirmation message; the former is sent by the Initiator node, and the latter is sent by the Responder node. Other messages are mentioned later, and all of the messages are multi-field packets. The number of fields is, to a fair extent, a design choice, but some fields are dictated by the characteristics of the underlying contention-based network.

One of the network characteristics that determine whether additional fields are required pertains, for example, to the manner in which messages propagate through the network. In some networks there is only one path that may be established between a node A and a node B, and that is also the path from node B to node A. In other words, communication between nodes A and B takes place over a bidirectional path. Other networks exist where it is known apriori that a packet might flow through one of a number of specific different paths; either a single path in each direction, or multiple paths in one or both of the directions. A different path is established in each of the two directions when, for example, the protocol chooses a path based on some cost measure of the links that make up the path and the link costs are direction sensitive (i.e., not the same in the two directions). Still other networks exist where it is not known precisely what path a packet will take and, typically, there is time variability to the path taken. The variability may be rather random, or more predictable. An example of the former is variability due to network load. An example of the latter is when nodes A and B are cell phones and the parties using the cell phone travel while talking, it is clearly possible that one or both of the cell phones will be handed-off from one cell to another cell in the course of a conversation, and before the handoff it is known that the handoff is about to happen.

In the context of this invention, it is highly undesirable to alter the path of communication (in the forward or the reverse directions) without first modifying the quiet zone. Therefore, as employed herein, a "subnetwork" encompasses whatever set of paths is used for communicating between the Initiator node and the Responder node, as long as it is a fixed set of paths. For the above-mentioned cell phone illustration, that means that before actual handoff occurs, some messaging must take place to establish a new quiet zone that is commensurate with new path (i.e., a new subnetwork). One simple way is to send a Termination message over the existing subnetwork, letting neighboring node exit their quiet state, and to send a new Reservation message or a Reservation Confirmation message, or both, over the new path (the Termination message is another message of the protocol of this invention).

Having established that the path, or paths, of communication will not change without first modifying the quiet zone, it is still an open question as to whether the forward path (from the Initiator node to the Responder node) uses a different set of intermediate node and communication links therebetween than the reverse path (from the Responder node to the Initiator node). The principles disclosed herein are applicable regardless of whether the forward path is the same as the reverse path.

The following addresses a number of the fields that may be included in the messages that make up the protocol of the method disclosed herein.

I. Reservation Message:

Type:

A required field. Identifies the type of message that the packet represents; for example, whether it is an information, or the specific kind of protocol message that it is. In this case, it is the Reservation message, and it may be designated by the alphanumeric "R."

Sender Address:

A required field. In connection with the Reservation message, this is the Initiator's address.

Addressee Address:

A required field. In connection with the Reservations message, this is the Responder's address.

Path List:

As indicated above, a subnetwork establishes a quiet zone to protect transmissions from interference; that is transmissions by nodes in forward path and in the reverse path. As indicated above, the quiet zone is created by causing neighboring nodes to be in a non-interfering state; but that, of course, prevents those nodes from providing any other service (in the working channel). It's as if those nodes disappeared from the network. Consequently, it is desirable to have a quiet zone that is as small as possible, and the smallest quiet zone that can be created is one where the forward path and the reverse path are the same. In networks where the forward path and the reverse path are not guaranteed to be the same, it is beneficial to force the two paths to be the same. One way to do so is to include a path list, that is created in the course of the Reservation message traversing the forward path, and which is used in the reverse path.

One way to choose the transmission path, and to thereby build the path list, is for the Reservation message to follow whatever path selection protocol the network normally employs, and to fix on that path. Normally such a multi-hop wireless network already employs certain routing protocol for computing paths. In such realizations, the Initiator node sends a message with "R" in the Type field (indicating that the message is a Reservation message), its own address in the Initiator Address field (for example "A"), the address of the Responder node in the Responder Address field (for example "B"), and the identity of the "next hop" node in the Path List field. The "next hop" node is the node that, according to the existing network protocol, node A determines to be the immediate destination of a packet whose ultimate destination is node B (for example, node C). The identity of the "next hop" node is included as the last node in the string of nodes that is entered in the Path List field; that is, the string "A,C". When node C receives the message and observes that it is identified as the last node in the string of nodes found in the Path List field but is not also identified in the Addressee Field, node C concludes that it is the immediate destination of the Reservation message, and that it is to behave as a relay node. It, therefore, accepts the Reservation message, proceeds to determine the "next hop" node toward node B (for example, node D), and transmits a Reservation message that is identical to the one that it received, except that the Path List field now contains the string "A,C,D". Node D receives the Reservation message and similarly relays the message, with the Path List field containing, for example, the string "A,C,D,E". In this manner, the Reservation message propagates toward node B and, thus, node B is informed of the path that was taken. Node B adopts the Path List path as the path for sending packets back to node A and, sends a Reservation Confirmation message that includes the Path List information that it received in the Path List field of the Reservation Confirmation message. This information is used to effectively force the Reservation Confirmation message to traverse the same path that the Reservation message traversed.

If the multi-hop network does not have any existing routing protocol, or it does but for some reason it is not suitable to use the forwarding paths computed by such a routing protocol, another realization of recording the transmission path is able to explore such a path without requiring any existing knowledge for how to forward a packet to its destination. In this approach, the Initiator broadcasts out a message with "R" in the Type field (indicating that the message is a Reservation message), its own address in the Initiator Address field (for example "A"), the address of the Responder node in the Responder Address field (for example "B"), and the identity of itself in the Path List field. It is a broadcast message because it contains no specific "next hop" or "immediate addressee" specification, so any neighbor node of the initiator node may receive the message. Upon receiving such a Reservation message, a node (for example "C"), after identifying that it is not the addressee of the Reservation message (it is not the Responder node) and it is not already listed in the Path List, appends its own identity to the end of the Path List and rebroadcasts the modified Reservation message. In the rebroadcast Reservation message the Path List contains node identity "A,C."

Because the Reservation message is broadcast, different neighbors may simultaneously receive the same transmission. Each of them then may append its identity to the Path List, and rebroadcast. As a result, an intermediate node may receive multiple copies of the same Reservation message. Such an intermediate node may simply rebroadcast all received copies of the message, or make a local decision on which copy to forward, e.g. append its own identity and rebroadcast. Illustratively, that may be the first received message, or the message with the shortest path list.

In this manner, some copies of the Reservation message reach Responder node B and node B chooses one of them, e.g. the first one it receives. As disclosed above, node B adopts the Path List path in this Reservation message as the path for sending a Reservation confirmation message back to node A. In this approach, a flooding radius field may be helpful to limit how far the Reservation message propagates if the Initiator node is certain that the Responder node is within such a radius.

In accordance with one illustrative embodiment, when the Path List field is used and the Reservation message creates the path as it advances toward the Responder node, each node that is used in the path of the Reservation message (path node) records the node to which forward messages flow; and when the Reservation confirmation message passes through the node, it records the node to which reverse messages flow. As indicated above, when the Initiator uses broadcast Reservation message, the Responder node must choose one particular Reservation message to respond among all received copies from the same original Reservation message. After a Responder node determines which Reservation message to respond to, the forward path is established. In embodiments where the same path is used for both the forward and the reverse paths, the Responder node copies the path into the path list into the Reservation Confirmation message, and the Reservation Confirmation message is forwarded along the reverse path of the string of nodes listed in the Path List.

While forwarding the Reservation Confirmation message, each node records the previous and next nodes from itself along the reserved path. They will use these two nodes as the next hops for forwarding data traffic during the reservation. Routes configured by the normal multi hop forwarding algorithm are not used during reservation period. In embodiments where the reverse path is allowed to be different from the forward path, the procedure used for the forward path is simply repeated in connection with the reverse path.

It is noted that when nodes have information about from where message may come and to where those message need to be relayed need very little header information in the information and control messages that after the subnetwork is established.

To recap, when the forward path is established by a protocol that relays the Reservation message from one network node to a specific other network node (that will become part of the forward path) other network nodes that receive the Reservation message and recognize that the message is not directed to them, know that they are not on the forward path. Consequently, they may immediately go into a non-transmitting mode based on the assumption that the subnetwork will be established. By including one or more of the time-out features that are discussed below, they can exist the non-transmitting mode if no traffic is detected on the subnetwork. In an alternate embodiment, they wait to enter the non-transmitting mode until they receive an Acknowledgement message (that originates in the Initiator node). When, however, the forward path is established by a protocol where each node that receives the Reservation message augments the message as disclosed above and broadcasts it, then a node that receives the Reservation message does not know whether it will be included in the forward path or not. In such a case, however, the Path list is used to establish the forward path, and advantageously that list is used to establish the reverse path (that has the same nodes as the forward path), in which case a node enters the non-transmitting mode of operation when it receives the Reservation Confirmation message.

Reservation Identifier:

This field contains a string, perhaps simply a number, which is chosen by node A. Embodiments where only a single copy of a sent Reservation message can possibly arrive at node B does not absolutely need this field because when Responder node B receives a Reservation message from Initiator node A, node B has enough information to send a Reservation Confirmation message, and when node A receives the confirmation message, node A has enough information to reasonably assume that the confirmation is in response to the sent Reservation message.

The Reservation Identifier becomes useful, however, when more than one copy of a Reservation message might arrive at node B or any intermediate node. Illustratively, the method that Initiator node A might use for identifying the subnetwork takes the form of node A broadcasting the Reservation message. Accordingly, each node selects one of the messages for relaying, and discards the others. Advantageously, each node selects the message with a Path List that has the fewest number of hops, which often is the first-received one.

Passcode:

Whether this field is used or not depends on the security requirements and security architecture of the network. The purpose of using the passcode is to prevent nodes other than nodes A and B from sending messages over the subnetwork and, of course, all nodes within the subnetwork must be able to verify that the passcode is bona fide. One simple approach is for the passcode to be the public key of node A, $PK_{public}$. (It is assumed herein that the network nodes are trusted to forward bonafide messages.) When messages are actually sent by node A, they may include a string that corresponds to a hash (using a one-way hash function) of the message that is encrypted with the private key of node A; i.e., the string is $PK_{private}$(Hp(message)), where $PK_{private}$ is the private key of node A corresponding to $PK_{public}$, and Hp(message) is a hash of the message with one-way function F. A node in the path, for example, node C, receives the message and the encrypted hash, decrypts the encrypted hash with the public key obtained from the Reservation message, itself hashes the message, and compares the decrypted hash to its own generated hash. If the two match, the message is bona fide. The same approach is used for messages purportedly from node B, using the public key of node B.

Reservation Duration:

This field, when used, specifies a time interval for the existence of the subnetwork. It is not absolutely necessary to use this field if the embodiment that is sought to be created takes the view that if nodes A and B agree on establishing a subnetwork, it is established until one of the nodes chooses to terminate the subnetwork by sending a Termination message. It is noted that this approach would face difficulties if a termination message is lost (or corrupted).

Alternatively, the subnetwork can be allowed to exist only as long as messages flow through subnetwork without a hiatus of more than a preselected time interval. In this approach the neighboring nodes in the quiet zone may not go to sleep (i.e., turn off all circuitry except for a "wake-up alarm clock" module). They need to listen and observe whether the time interval of the aforementioned hiatus has expired.

In networks where the above limitations would constitute disadvantages, using the Reservation Duration field avoids the disadvantages because it allows the neighboring nodes in the quiet zone to actually go to sleep for the duration of the time close to the interval specified by the Reservation Duration field.

In an embodiment where in addition to having a specified Reservation Duration interval it is possible for either node A or node B to disband the subnetwork before expiration of the time period specified by the Reservation Duration field, the neighboring nodes in the quiet zone have the option of either going to sleep, or simply being in a non-interfering mode, listening for the possible reception of a Termination message.

Idle Timeout:

This field specifies the expected maximum idle time between packets. This field is also not necessary, but it is helpful to effectively disband the subnetwork, even before the specified reservation duration expires, when, for example, nodes A and B cease to communicate as promised (i.e., by sending packets more closely spaced than the idle timeout). It is certainly a useful field in applications where a Reservation Duration field is not employed.

Packet Arrival Interval:

This field specifies the packet arrival times. When this field is employed, nodes of the subnetwork can go to sleep between packet arrivals, thereby conserving power. This is an important benefit when the nodes are battery-powered.

Step Interval:

This field effectively specifies a frame structure, with a frame duration of, for example, T. It basically states that every node (including nodes A and B) operate in the mode of either sending, or receiving packets at the beginning of each frame. Starting, illustratively, with node A, what this field promises is that node A will send packets only at the beginning of the 1st and all subsequent odd-numbered frames. The next node in the path (node C in the above discussion) agrees to receive packets at the beginning of the first and all subsequent odd-numbered frames, and promises to transmit packets at the beginning of all even-numbered frames. Each node thus operates almost in synchronism, and is able to go to sleep during each frame from the time it finishes transmitting or receiving until almost the beginning of the next frame, whereupon it wakes up, ready to receive a transmitted packet or transmit a packet received during the previous frame. This field is not necessary when power conservation is not an important goal.

Negotiable:

The above disclosure indicates that the Responder node sends a Reservation Confirmation message in response to the Reservation message. It goes almost without saying that if the Responder node wishes to decline the communication with the Initiator node it can simply fail to respond with a response confirmation message. It is possible, however, that the Responder node is not willing to have a subnetwork established as suggested by node A via the Reservation message, but is willing to have a subnetwork established in some other way. For example, the Responder node might determine that a Reservation Duration of P seconds that is contained in the Reservation message is too long for it to accept, but it is willing to accept a Reservation Duration of Q that is less than P. One approach for enabling such a give-and-take is to include a Negotiable field, which can be a 1-bit field. It specifies whether or not node A is willing to entertain a proposed modification to the reservation. The Responder node B may agree to whatever value is found in the Reservation Duration message, or suggest a modified value. The Reservation Confirmation message contains the modified value. The Initiator node may agree to the modification or not.

In embodiments where the forward path and the reverse path are not the same, it is necessary to inform all nodes, on both paths, of the agreed Reservation Duration value. Therefore, when node A finds that the Reservation Duration value found in the Reservation Duration field of the Reservation Confirmation message is different from the value it sent out with its Reservation message, and agrees to this different value, node A sends a Reservation Acknowledgement message.

In embodiments where a Reservation Acknowledgement message is used, this field can also be used by the intermediate nodes in the subnetwork. Specifically, an intermediate node that receives a Reservation message and does not agree to the proposed Reservation Duration found in the message that it receives may alter the value in the Reservation Duration field.

When node A does not wish to accept the altered Reservation Duration value, it may seek alternative forwarding path, change reservation duration and send out another Reservation message, or altogether drop the established subnetwork. To drop the established subnetwork, node A can simply remain quiet and have the established subnetwork drop on its own (for example, because the duration has expired or the Idle Timeout interval has expired). It is preferred, however, for node A to send a Termination message. As an aside, different methods exist for finding an alternate path in a network, but that is not part of this present invention.

When the Negotiable flag is set to true, an additional step for querying neighbor node participation is needed before each intermediate node forwards Reservation message. That is, the intermediate node broadcasts a Participation Query message, and waits for a preselected time interval. If within this time interval it receives no negative reply, it forwards the Reservation message; otherwise it drops the Reservation message without retransmitting it. If the Reservation Confirmation message travels a different path from the corresponding Reservation message, similar neighbor querying step is incorporated. One reason for sending the Participation Query message is that a neighbor node might be too important to the overall network to agree to become non-transmitting. If such a neighbor node of a given node refuses to become non-transmitting, the given node cannot allow itself to be included in the path.

Renewal Window:

When the agreed-upon Reservation Duration interval is shorter than the expected duration of a communication session it would be advantageous to renew the reservation before it actually expires. One of the reasons that this is desirable is because stability in path results in stability of packet delay. Moreover, sending a reservation from node A to node B, when the subnetwork is still in existence has the benefit of the Reservation message flowing through the subnetwork itself (because all neighboring nodes that are not along the path are in their quiet state); and that means that the Reservation message has no interference issues. Of course, all of the neighboring nodes in the quiet zone must receive the renewal message as well, and that means that they must be awake enough to receive this message. Otherwise they wake up at the end of the first reservation interval, not knowing the reservation has been renewed, and they may begin to transmit, thereby destroying the subnetwork. Effectively, this field informs the neighboring nodes when they ought to wake up and listen to transmissions in order to detect the passage of a new Reservation message, should one be sent.

Neighbor Sleep Allowed:

The purpose for this field is to ensure that if the subnetwork is disbanded prematurely, the neighbors are able to receive the reservation termination message. That is, if the Initiator node determines that the subnetwork will not be disbanded prematurely, then this field in the Reservation message informs the neighbor nodes that they can go to sleep, rather continually listen to a possible arrival of a termination message.

New Channel:

In embodiments where the network can support a plurality of independent channels (for example, different channels operating at different carrier frequencies) it is possible for an Initiator node to suggest that the entire subnetwork be established in a channel that is different from the channel over which the Reservation message is sent. This is accomplished with the New Channel field specifying the channel to be used. Upon receiving a Reservation message with the New Channel field specifying a different channel, each node copies the new channel information into its outgoing message, including the Responder node—whose outgoing message is the Reservation Confirmation message, and switches to the channel specified by the New Channel field. Neighboring nodes need not enter a non-interfering state because the state in which they are in automatically becomes non-interfering.

Figure 2:
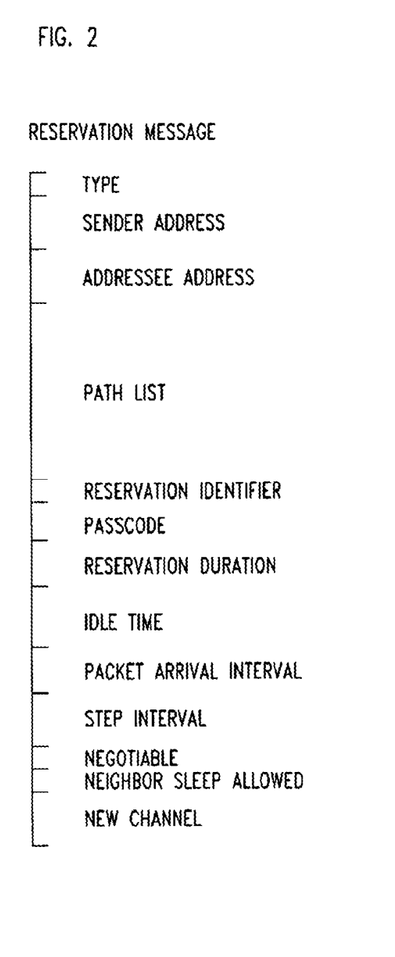
FIG. 2 depicts the various fields of a reservation message that is sent by the initiator node to the responder node when establishment of a high QoS path is desired.

FIG. 2 depicts the various fields of a Reservation message.

II. Reservation Confirmation Message:

Type:

A required field. Identifies the type of message that the packet represents; in this case, a Reservation Confirmation message; for example, the string "RC."

Sender Address:

A required field. In connection with the Reservation message, this is the Initiator's address.

Addressee Address:

A required field. In connection with the Reservations message, this is the Responder's address.

Passcode:

If the received Reservation message contains a passcode, the Reservation Confirmation message also contains a passcode; for example, a public key of the Responder node.

Other Fields:

The Responder simply copies the fields found in the Reservation message.

III. Reservation Termination Message:

Type:

A required field. Identifies the type of message that the packet represents; in this case, a Termination message; for example, the string "RT."

Sender Address:

A required field.

Addressee Address:

A required field.

Reservation Identifier:

The sender (whether it is the Initiator node or the Responder node) simply copies the Reservation Identifier, if one is found, in its received Reservation message or Reservation Confirmation message.

Passcode:

If the received Reservation message or Reservation Confirmation message contains a Passcode field, then the Termination message also contains a Passcode field.

Other Fields:

No other fields need to be included.

IV. Reservation Renewal Message:

Type: A required field. Identifies the type of message that the packet represents; in this case, a Rejection message; for example, the string "RW."

Sender Address:

A required field. In this case, it is the Initiator node.

Addressee Address:

A required field. In this case, it is the Responder node.

Reservation Identifier:

A required field, if the Reservation message has one.

Other Fields:

Copy of the fields found in the last-received Reservation Confirmation message.

V. Reservation Acknowledgement Message.

Type:

A required field. Identifies the type of message that the packet represents; in this case, a Rejection message; for example, the string "RA."

Sender Address:

A required field. In this case, it is the Initiator node.

Addressee Address:

A required field. In this case, it is the Responder node.

Reservation Identifier:

A required field, if the Reservation message has one.

Other Fields:

Copy of the fields found in the last-received Reservation Confirmation message.

Node Architecture:

Each node of the network can have two modes of operation. One is its native mode, and the other is its subnetwork-related mode (SR mode). A network node is in its SR mode when it serves as an Initiator node, a Responder node, an intermediate node of a subnetwork, or a neighbor node. It can be observed that a node that is in some SR mode flavor (Initiator node, a Responder node, an intermediate node of a subnetwork, or a neighbor node) can neither add another flavor nor change flavor. It can only change to its native mode.

To function in its native mode, each node includes certain hardware and possibly software modules. These are not discussed here because they don't form a part of this invention and they are intimately related to the type of contention-based network one has.

To serve as an Initiator node, each node includes a module for creating a Reservation message, a Reservation Termination message, a Reservation Confirmation message, and a Reservation Renewal message. Optionally, the node includes circuits for conserving power during times when it is known that no information packets will flow. Also optionally, the node includes circuits or modules for changing the channel in which the node operates. These circuits and/or modules are optionally also used in connection with other flavors of the SR mode.

To serve as an intermediate node of a subnetwork path, each node includes a module for relaying a received Reservation message (which includes the ability to contribute to the establishment of the Path List string, disclosed above), and a similar module for relaying a received Reservation Confirmation message.

To serve as a Responder node, each node includes a module for responding to a received Reservation message with a Reservation Confirmation message.

To serve as a neighbor node, each node includes circuits and/or modules for placing the node in a non-interfering state, and for exiting the non-interfering state upon the occurrence of one of more predefined conditions.

Data Forwarding:

After the Initiator node receives the Reservation Confirmation message, and after sending a Reservation Acknowledgement message, if appropriate, the Initiator node begins sending information packets.

As is conventional, information packets comprise a number of fields, one of which is the data, or payload, field. Applications that did not employ a Path List field in setting up the subnetwork include a source field and a destination field. Applications that did employ the Path List field can do without the source field or the destination field because each node knows the identity of the node from which it receives packets and the identity of the node to which the packets it sends are destined.

Applications where the Reservation message included a Passcode field, all messages include a field related to the Passcode field. As suggested in the illustrated example above, this field may contain a signature in the form of a hash of the message, encrypted with one-way function F and encrypted with the private key of the Initiator node.

Advantageously, each information packet also includes a Sequence Number field that is incremented with each sent information packet.

For one way traffic, for example from the Initiator node to the Responder node, channel access delay is predictable. The Initiator node can calculate packet spacing without much difficulty and can space its packets to leave enough time so that when the next packet is sent out, the previous packet has already been forwarded far enough, e.g., at least 3 hops away. For example if the Initiator node transmits packets at periodicity T and the path consists of 3 nodes (in addition to the Initiator and the Responder nodes), the Initiator can transmit at times $nT+0$, the next node can transmit along the forward path at times $nT+T/8$, the next node can transmit along the forward path at times $nT+2T/8$, and the next node can transmit along the forward path at times nT+3T/8. The responder can then reply (if it so chooses) at times nT+4T/8, the next node can transmit along the reverse path at times nT+5T/8, the next node can transmit along the reverse path at times nT+6T/8, and the next node can transmit along the reverse path at times nT+7T/8, where n=1, 2, 3, . . . . Of course, at times when a node does not expect to receive a packet, and at times when a node is not scheduled to transmit a packet the node can be powered down to reduce power consumption.

The one way traffic model can still be used to carry a two way conversation. The Initiator node can cause the establishment of a subnetwork; send data to destination, then terminate the reservation. The Responder node can then become the Initiator node, cause the establishment of a subnetwork; send data to destination, and then terminate the reservation. This usage model fits naturally with "push to talk" type of applications.

The present invention can also be used to carry two way encrypted communications in a half-duplex fashion as disclosed above. Communication in the forward path uses the public key of the responder node and communication in the reverse path uses the public key of the Initiator node.

An "in between" type of operation can be effected by including a Reply By field in the information packet. This field specifies that if the Responder node has an information packet to send, it must send it within the time window following receiving of an information packet from the Initiator node. If the Responder node misses this chance, it must wait for the next opportunity, following the next information packet from the source. With this mechanism, the Initiator node can send out new information packet either after it receives the return packet from the Responder node, or time out if no return packet received within the "reply by" windows plus the round trip delay.

Also each information packet can include an Acknowledgement Policy field. This field specifies how information packets can be acknowledged. There can be two types of acknowledgements, hop by hop, or end to end. Acknowledgement to a specific information packet can be matched by including the Sequence Number of the acknowledged information packet.

Hop-by-hop acknowledgement can be explicit, implicit, or hybrid. If an explicit hop-by-hop acknowledgement is required, each forwarding node will first acknowledge the reception of the information packet, then forward information packet to its next hop. The destination of the information packet may also acknowledge the reception of the information packet even though it does not forward the information packet any farther. Since there is no contention, both transmissions can be scheduled immediately and only a small gap is needed to separate the two transmissions. The hop-by-hop acknowledgement can also be implicit without needing any acknowledgement message. A forwarding node knows that the next hop node has received the packet if it hears that this next hop node forwards the same packet to the subsequent next hop node. Implicit acknowledgement is not available for the last hop because the destination does not forward the information packet any further. So, hybrid hop-by-hop acknowledgement policy maybe employs, which requires only the destination node to acknowledge the information packet explicitly and all other nodes along the forwarding path use implicit acknowledgement. Note here the "destination" means the destination for an information packet. It can be either the reservation source or reservation destination.

It may be mentioned that, implicit acknowledgement requires the path nodes remain on longer to overhear the transmission by the next hop.

End-to-end acknowledgement can also be either explicit or embedded. Explicit end-to-end acknowledgement is done by the data destination sends an "acknowledgement" message to the data source. Embedded acknowledgement is done by embedding a special flag in return trip information packet indicating that the last incoming information packet has been received.

In the context of this disclosure, the term "received" encompasses a unit receiving a message and acting on it only to the extent of determining that the message is not intended for the unit, as well as determining that the message is (explicitly or implicitly) intended for the unit, and acting on it accordingly.

What is claimed is:

1. A method executed in a contention-based network for establishing a two-way communication path including a forward path and a reverse path between a first node and a second node, the method comprising:
   said first node sending a reservation message addressed to said second node through said forward path, which reservation message requests a reservation of said two-way communication path, said forward path including said first node, said second node, and one or more other nodes of said network;
   said second node, in response to said reservation message, sending a reservation confirmation message to said first node through said reverse path, said reverse path including said second node, said first node, and one or more other nodes of said network;
   each of one or more first neighbor nodes, which are not path nodes, that receives said reservation message from at least one of the nodes in the forward path, setting itself to a non-transmitting mode of operation for a duration of the reservation of the two-way communication path responsive to receiving said reservation message and not being one of the path nodes, said path nodes being nodes in the forward path and nodes in the reverse path;
   each one or more second neighbor nodes, which are not path nodes, that receives the confirmation message from at least one of said nodes in the reverse path, setting itself to the non-transmitting mode of operation for the duration of the reservation of the two-way communication path responsive to receiving said confirmation message and not being one of the path nodes,
   wherein the reservation message includes a negotiable field, specifying whether said first node is amenable to proposed changes in the reservation message.

2. The method as recited in claim 1 further comprising the second node suggesting a modified value of a reservation duration in the reservation message in the confirmation message, said reservation duration specifying a length of time for said reservation.

3. The method as recited in claim 2 further comprising the first node sending out a reservation acknowledgment message in response to the modified value of the reservation duration and the first node agreeing with the modified value.

4. The method as recited in claim 2 further comprising one of the nodes along the forward path, other than the second node, modifying a value of a reservation duration in the reservation message if the one of the nodes along the forward path does not agree with the value of the reservation duration.

5. The method of claim 1 where nodes of said network that are not path nodes and not first or second neighbor nodes operate pursuant to a contention-based protocol, whereas said path nodes operate pursuant to a protocol that is other than a contention protocol.

6. The method of claim 1 where said reverse path is set to comprise the nodes that are included in said forward path.

7. The method of claim 1 where said reservation message includes a field that conveys to said second node information about said forward path.

8. The method of claim 7 where said field contains a listing of nodes included in said forward path.

9. The method of claim 1 where said reservation message includes an originator field that contains identity of said first node, a responder field that contains identity of said second node, and a type field that identifies the message as a reservation message.

10. The method of claim 1 where said reservation message includes a path field, into which identities of nodes in said forward path are inserted.

11. The method of claim 1 further comprising sending a reservation termination message via said path nodes to terminate the two-way communication path.

12. The method of claim 1 further comprising the first node sending a reservation renewal message to renew the reservation for the two-way communication path during the duration of the reservation before the two-way communication path expires.

13. A method executed in a contention-based network for establishing a two-way communication path including a forward path and a reverse path between a first node and a second node, the method comprising:
said first node sending a reservation message addressed to said second node through said forward path, which reservation message requests a reservation of said two-way communication path, said forward path including said first node, said second node, and one or more intermediate nodes of said network, wherein the reservation message includes a negotiable field, specifying whether said first node is amenable to proposed changes in the reservation message;
each one or more intermediate nodes broadcasting a participation query and waiting a time interval, and forwarding the reservation message along the forward path if the one or more intermediate nodes receives no negative reply in response to the participation query within the time interval and each one or more intermediate nodes dropping the reservation message without transmitting the reservation along the forward path if the negative reply is received within the time interval;
said second node, in response to receiving said reservation message, sending a reservation confirmation message to said first node through said reverse path, said reverse path including said second node, said first node, and one or more other nodes of said network.

14. The method as recited in claim 13 further comprising:
if said reverse path includes one or more nodes that are different than said forward path, the one or more nodes that are different in the reverse path broadcasting another participation query and waiting another time interval, and forwarding the reservation confirmation message along the reverse path if the one or more nodes receives no negative reply in response to the other participation query within the other time interval and each of the one or more nodes of the reverse path dropping the reservation confirmation message without transmitting the reservation confirmation message along the reverse path if the negative reply is received within the other time interval.

* * * * *